United States Patent [19]

Stubbe

[11] 4,105,147
[45] Aug. 8, 1978

[54] EXTRUDER SCREW VALVE

[76] Inventor: Paul L. Stubbe, Box 111, Girard, Pa. 16417

[21] Appl. No.: 765,973

[22] Filed: Feb. 7, 1977

[51] Int. Cl.² .......................... B29F 1/04; F16K 15/08
[52] U.S. Cl. .................................. 222/413; 137/512.1; 137/533.17; 222/495; 222/524; 425/562
[58] Field of Search ........ 425/562, 563, 564, 207–209; 222/413, 495, 524, 525, 559, 509, 229, 246; 137/528, 533.17, 533.19, 533.21, 533.25, 533.27, 533.29, 512.1

[56] References Cited

U.S. PATENT DOCUMENTS

| 3,335,461 | 8/1967 | Schwartz | 222/413 X |
| 3,438,393 | 4/1969 | Godley | 137/533.17 |
| 3,590,439 | 7/1971 | Swanson | 137/533.17 X |
| 3,726,309 | 4/1973 | Neubert | 222/413 UX |

Primary Examiner—Robert B. Reeves
Assistant Examiner—David A. Scherbel
Attorney, Agent, or Firm—Charles L. Lovercheck

[57] ABSTRACT

The invention disclosed herein is an injection molding machine unit having a barrel, with an injection nozzle on one end of the barrel and a screw ram movable in the barrel, a valve member with axially extending grooves in the periphery thereof, supported on the ram shaft, a ring on the ram shaft adjacent the valve. The ring has axially extending grooves in its outer periphery and the ring moves out of alignment with the grooves in the valve. The grooves of the ring form a fluid flow passage for plastic material to the injection nozzle when the screw is rotated and the ram is retracted. The valve closes when the ram moves forward.

15 Claims, 11 Drawing Figures

U.S. Patent Aug. 8, 1978 4,105,147
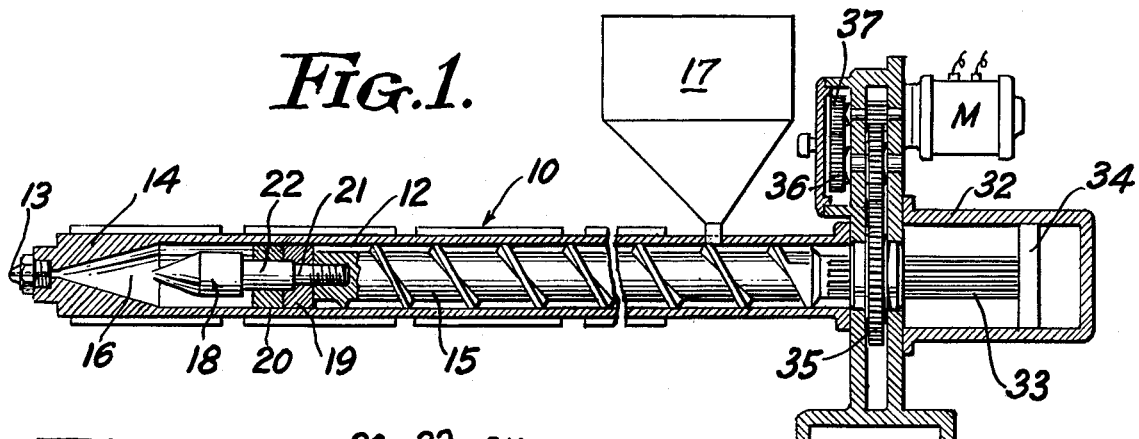
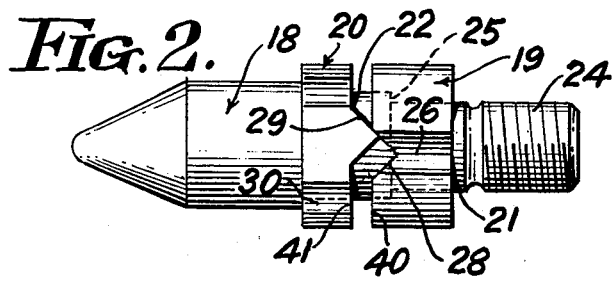
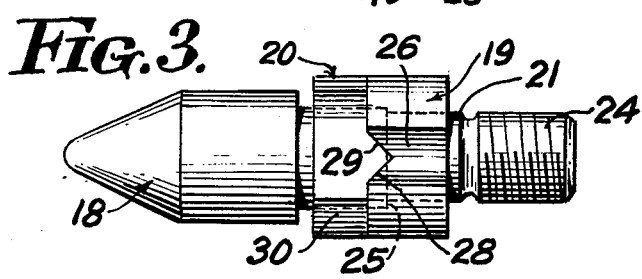
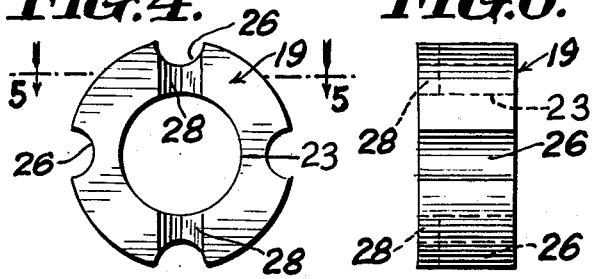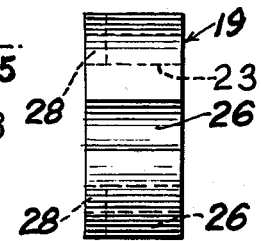
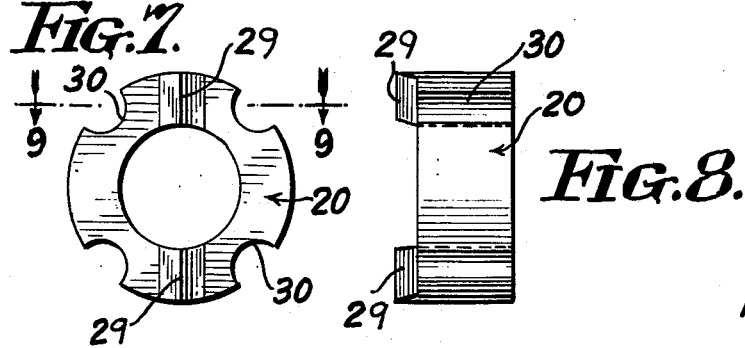
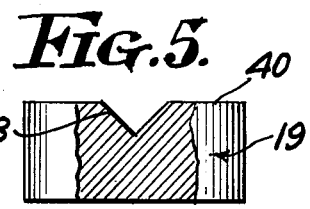
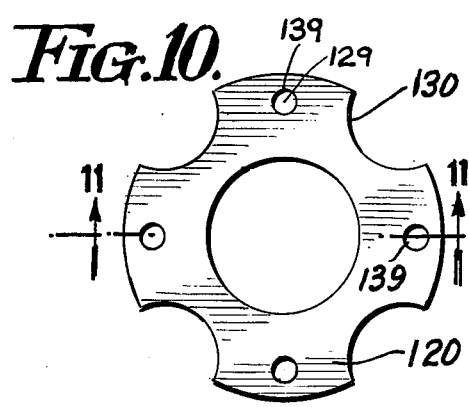

EXTRUDER SCREW VALVE

REFERENCE TO PRIOR ART

The injection molding unit disclosed herein constitutes an improvement over the molding machine unit shown in U.S. Pat. No. 3,888,393.

OBJECTS OF THE INVENTION

It is an object of the invention to provide an improved injection molding unit.

Another object of the invention is to provide an injection molding machine non-return valve unit that is simple in construction, economical to manufacture, has a longer life, reduced maintenence, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a longitudinal cross-sectional view of the injection molding machine with improved check valves on it.

FIG. 2 is an enlarged view of the tip and check valve according to the invention with the check valve in open position.

FIG. 3 is a view similar to FIG. 2 showing the check valve in closed position.

FIG. 4 is an end view of the stationary part of the check valve shown in FIG. 2 and FIG. 3.

FIG. 5 is a cross-sectional view of the check valve part taken on line 5—5 of FIG. 4.

FIG. 6 is a side view of the check valve part shown in FIG. 4.

FIG. 7 is an end view of a sliding part of the check valve.

FIG. 8 is a side view of the check valve part shown in FIG. 7.

FIG. 9 is a cross-sectional view taken on line 9—9 of FIG. 7

FIG. 10 is an end view of another embodiment of a part of the check valve.

FIG. 11 is a partial longitudinal cross-sectional view taken on line 11—11 of FIG. 10.

DETAILED DESCRIPTION OF THE DRAWINGS

Now, with more particular reference to the drawings, the injection molding unit indicated generally at 10 has a barrel 11 with a generally cylindrical bore 12 therein. A nozzle 13 is supported on the closed end 14 of the barrel and a screw 15 is rotatably and axially movable in the bore. The screw 15 has a ram head 18 supported on its end adjacent the nozzle 13 and movable in the cavity 16. A fixed valve part 19 is fixed to the reduced size part 21 of the ram head and movable valve part 20 is slidably supported on the enlarged cylindrical part 22 of the head. The fixed valve part 19 has a central bore 23 therein which receives the reduced size part 21 and when the threaded end 24 is threaded into the end of the screw, the fixed part 19 will be firmly clamped between the shoulder 25 and the end of the screw 15 adjacent thereto.

The fixed part 19 of the valve has circumferentially spaced axially extending grooves 26 in the outer periphery and these grooves form a flow passage for plastic material which moves from the hopper 17 through the screw 15 and the grooves 26 to the cavity 16. The fixed valve part 19 has the radially extending grooves 28 in its downstream end and the grooves 28 are complementary in shape to the projections 29 on the moveable part 20 of the valve.

The outer cylindrical periphery of the moveable valve part 20 has the axially extending circumferentially spaced grooves 30. On the forward stroke of the screw 15, grooves 30 are moved out of alignment with the grooves 26 in the fixed part 19 when the screw 15 is moved forward by the piston 34 in the cylinder 32. The pressure of the plastic in cavity 16 forces the moveable valve part 20 toward the fixed valve part 19. The projection 29 moves into the radial groove 28, thus, turning the moveable valve part 20 and moving the grooves 30 out of alignment with the grooves 26. As shown in FIG. 3, the surface 40 seats on surface 41 stopping the flow of plastic material, the material in cavity 16 is thus trapped and it is forced out nozzle 13 into the die connected thereto.

The screw is rotated by the motor M which drives the gear 35 by the gears 36 and 37 and the gear 35 is mounted on the piston rod 33 by a splined connection shown. The outer periphery of the fixed valve part 19 and the outer periphery of the moveable valve part 20 snugly fit in the cylindrical bore 12 of the barrel. Thus, when the screw is moved away from the nozzle 13 and plastic from hopper 17 is moving through the screw 15, the pressure fom the plastic forces the moveable valve part 20 away from the fixed part 19 to the position shown in FIG. 2, thus, aligning the grooves 30 and the grooves 26 allowing material to flow through the groove 26 to the space between the two valve parts and through the groove 30 to the cavity 16.

In another embodiment of the invention, pins 129 are substituted for the projections 29 and groove 28. The pins 129 are received in moveable valve part 120 in spaced bores 139 between the grooves 130 and are spaced generally about the circumference of the moveable valve part 120. The pins 129 extend from the moveable valve part 120 and extend into the circumferentially spaced axially extending grooves 26 in the outer periphery of fixed valve part 19. The pins 129 extending into the grooves 26 hold the grooves 130 out of alignment with the grooves 26 in the fixed valve part 19. The moveable valve part 120 will be slidably supported on a ram head 18 in the same manner as shown in FIGS. 1, 2 and 3.

Plastic flowing from the hopper 17 and through the screw 15 will enter the ram head 18 through the grooves 26. The pressure of the plastic will push the moveable valve part 20 forward permitting the plastic to flow through the grooves 26, through the space between the valve parts, over to the grooves 30, and through the grooves 30 into the cavity 16.

When the ram head 18 is moved forward the pressure of the plastic in the cavity 16 will push the moveable valve part 20 back to the fixed valve part 19, bringing surfaces 40 and 41 into engagement and shutting off the flow of plastic which is thus trapped and forced out of nozzle 13.

In this embodiment, the grooves 30 and 26 are not permitted to align by the pins 129. The movement of valve part 20 opens a space through which the plastic can flow between the grooves 30 and 26. Plastic will be squeezed out of this space when the valve is closed by the forward stroke of the ram head 18 and the resultant pressure in cavity 16 against the moveable valve part 20.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An injection molding unit comprising,
   a barrel having a generally cylindrical bore therein, said bore having its first end closed,
   a nozzle in said closed end,
   a screw having a first end and a second end,
   a ram head on said first end of said screw,
   said ram head having a shoulder means adjacent to said screw,
   a first valve part on the end of said screw adjacent said ram head engaging said shoulder,
   an intermediate part of said ram head extending from said shoulder means to said ram head, slidably receiving a second valve part thereon,
   said first valve part and said second valve part being generally cylindrical in shape and slidably and rotatably received in said barrel,
   flow means in the outer periphery of said first valve part and extending axially along said outer periphery the entire length of said first valve part and cooperating with means in the outer periphery of and extending axially along the entire length of said second valve part providing a flow passage between said nozzle and said barrel,
   said second valve part being adapted to move into seating engagement with said first valve part when said screw is moved in a direction toward the nozzle and means on said second valve part engagable with means on said first valve part holding said flow means in said valve parts out of alignment with each other when said valve parts engage each other interrupting flow from said screw to said nozzle,
   said second valve part being adapted to move away from said first valve part when said screw is moved in a direction away from said nozzle whereby material can flow from said screw into the space in said barrel adjacent said nozzle.

2. The injection molding unit recited in claim 1 wherein said means in the periphery of said valve parts comprise at least one axially extending slot in the outer periphery of said first valve part and at least one axially extending slot in said second valve part.

3. The machine recited in claim 2 wherein there are at least four said slots in said first valve part and at least four said slots in said second valve part.

4. The machine recited in claim 3 wherein said first valve part is fixed to said screw and said second valve part is moveably supported on said screw.

5. The injection molding unit recited in claim 4 wherein said intermediate part of said ram head is cylindrical and a frusto-conical point is fixed to said cylindrical part,
said second valve part being slidable on said cylindrical part toward and away from said first valve part.

6. The injection molding unit recited in claim 3 wherein said means to hold said valve parts in relative position to each other comprises a projection on one of said valve parts having inclined sides converging toward the other said valve part and the other said valve part has a depression having inclined sides complementary in shape to said surfaces on said projection.

7. The machine recited in claim 2 wherein means is provided on said first valve part adapted to cooperate with means of said second valve part for holding said second valve part with the said slot in said second valve part out of alignment with said means in said first valve part whereby flow from said barrel to said nozzle is interrupted when said valve parts are brought into engagement with each other.

8. The injection molding unit recited in claim 2 wherein said means on said second valve part engageable with means on said first valve part comprises a projection on one said valve part adapted to be received in a female member in the other said valve part whereby said second valve part is held in a definite position relative to said first valve part when said valve parts engage each other.

9. In combination, an injection molding machine having a barrel and a nozzle and a ram in said barrel and a valve supported on said ram adjacent said nozzle,
   said valve comprising a first valve part and a second valve part,
   support means supporting said first valve part on said ram,
   means slidably supporting said second valve part on said ram,
   said first valve part having an outer surface slidably received in said barrel,
   a seating surface on said first valve part,
   a seating surface on said second valve part,
   said second valve part being adapted to slide from a position when said seating surfaces engage each other to a position wherein said seating surfaces are spaced from each other,
   axially extending flow passages in the outer periphery of said first valve part extending the entire length of said outer periphery of said first valve part,
   flow passages in said second valve part extending along the entire length of the outer periphery of the second valve part,
   and restraining means holding said second valve part in a position to misalign said flow passages with said flow passages in said first valve part when said seating surfaces engage each other.

10. The combination recited in claim 9 wherein said restraining means comprises a radially disposed, axially extending shaped slot in the side of one of said valve parts adapted to receive a radially disposed axially extending V-shaped projection in the other said valve part.

11. The combination recited in claim 9 wherein said restraining means comprises axially extending pins in one said valve part received in said flow passages in said other valve part.

12. The combination recited in claim 11 wherein said flow passages comprise axially disposed slots in the outer periphery of said valve part.

13. The combination recited in claim 9 wherein restraining means comprises axially extending rods formed to one said valve part slidably received in said flow passages in the other said valve part.

14. The combination recited in claim 9 wherein said flow passages comprise axially disposed slots in the outer periphery of said valve part.

15. The combination recited in claim 9 wherein said valve parts each have a central bore,
said ram has a headed member having an intermediate part fixed to said headed member and a reduced size part between said ram and said intermediate part,
said reduced size part is received in said central bore of said first valve part and said second valve part is slidably received on said intermediate part.

* * * * *